United States Patent

Howard et al.

[15] 3,688,087
[45] Aug. 29, 1972

[54] METHOD AND APPARATUS FOR HANDLING MATERIALS

[72] Inventors: Joseph D. Howard, 657 Blair Ave., Piedmont, Calif. 94611; William M. Brobeck, 120 Sleepy Hollow Lane, Orinda, Calif. 94563

[22] Filed: Aug. 2, 1968

[21] Appl. No.: 749,815

Related U.S. Application Data

[63] Continuation of Ser. No. 820,670, June 16, 1959, abandoned.

[52] U.S. Cl.....235/61.9 R, 235/61.11 E, 235/61.7 R, 340/174.1 H
[51] Int. Cl..........G06k 1/12, G11b 5/02, G06k 7/10
[58] Field of Search..235/94.14, 61.11, 61.6, 61.115, 235/61.9, 61.7 R; 340/174.1 H, 174.1

[56] References Cited

UNITED STATES PATENTS

| | | | |
|---|---|---|---|
| 3,111,576 | 11/1963 | Lipschutz | 235/61.11 J |
| 3,121,159 | 2/1964 | Rogal | 235/61.6 |
| 3,277,445 | 10/1966 | Diamant | 235/61.9 |
| 3,348,027 | 10/1967 | Wallace | 235/61.9 |
| 3,355,576 | 11/1967 | Childers | 235/61.7 |
| 3,414,731 | 12/1968 | Sperry | 250/219 |
| 1,801,981 | 4/1931 | Rogal | 235/61.6 |
| 2,353,002 | 7/1944 | Armbruster | 235/61.8 |
| 2,746,679 | 5/1956 | Stratton | 235/61.6 |
| 2,839,615 | 6/1958 | Sarratt | 340/174.1 H |
| 2,895,123 | 7/1959 | Foster | 340/174.1 |
| 2,919,851 | 1/1960 | Otis | 235/61.9 |
| 2,981,936 | 4/1961 | Buhrendorf | 340/174.1 H |
| 3,002,181 | 9/1961 | Parsons | 235/61.11 X |
| 3,004,702 | 10/1961 | Kranz | 235/61.115 |
| 3,013,254 | 12/1961 | Walker | 340/174.1 H |
| 3,035,764 | 5/1962 | Beman | 235/61.9 |

Primary Examiner—Maynard R. Wilbur
Assistant Examiner—Robert M. Kilgore
Attorney—Gregg and Hendricson

[57] ABSTRACT

A system for handling a large variety of different items to provide automatic price and inventory information. Each different kind, type and size of items or goods carried, for example, in a retail store are separately marked with a distinctive visible coded indicia with only like items bearing like indicia and all like items bearing identical indicia. Control means are provided for applying to a converter having memory means each of the different coded indicia for storage in the memory means thereof and the control means also applies a separate and variable price corresponding to each coded indicia to the converter for storage in the memory means thereof with each price being related to the corresponding coded indicia. A register is provided for registering the coded indicia of items distributed as by sale or the like and for applying such indicia to the converter. The converter includes means for receiving the registered indicia and establishing identity between the instantly registered indicia and previously stored indicia as well as output means for producing the price corresponding to the stored indicia that is identical to the registered indicia. Means are also provided for recording the registered coded indicia and the corresponding price of each registered coded indicia.

6 Claims, 4 Drawing Figures

INVENTORS
JOSEPH D. HOWARD
WILLIAM M. BROBECK

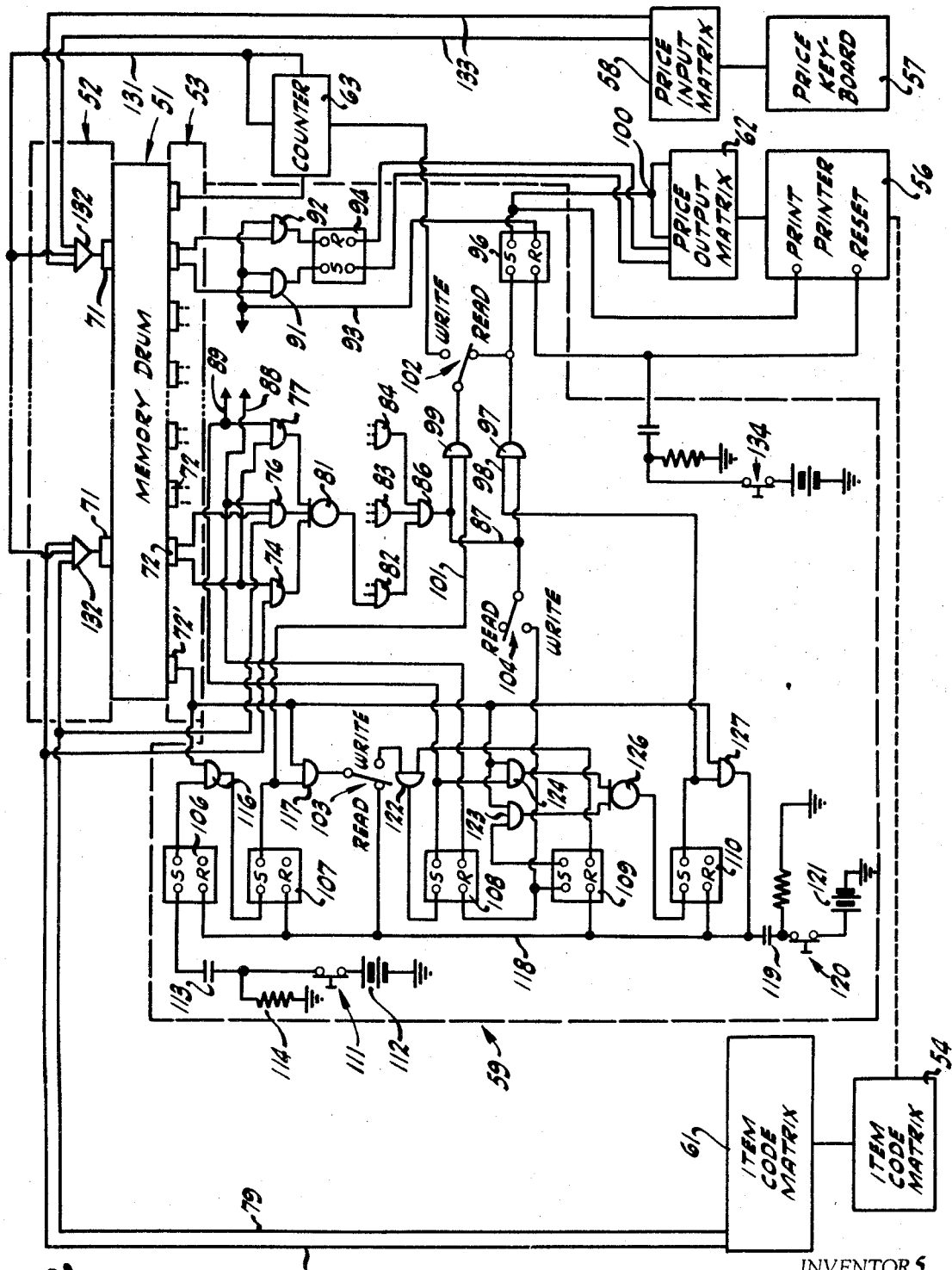

METHOD AND APPARATUS FOR HANDLING MATERIALS

This is a continuation of Application Ser. No. 820,670, filed June 16, 1959, now abandoned.

This invention relates to an improved method and apparatus for rapidly and efficiently handling and inventorying a wide variety of materials and particularly to the improved handling and inventorying of the wide variety of packaged material or items commonly included in the flow of commerce from manufacturer to consumer via various wholesalers, jobbers, and retailers.

Modern economy requires a continual flow of consumer goods from the ultimate manufacturer or packaging agent through various intermediate collection, storing, and distribution points to a large plurality of retail outlets whereat the general public is able to obtain by purchase the necessities and luxuries of present day civilization. In this flow of consumer goods, there is included a tremendous amount of handling and rehandling of same, and particularly at the ultimate distribution point is there involved a maximum degree of manual manipulation of the myriad items normally stocked by retail outlets. Individual manual handling is required for every separate item of goods in a retail store for the stocking of shelves, price marking of the items, registering and accounting each of the items sold, and periodic inventories of the stock. In the sale of items alone, there is involved a multitude of manual operations which is highly inefficient from the viewpoint of the operator, undesirable as regards the time delay occasioned the purchaser, and quite costly for the store owner. A substantial bottleneck in the flow of consumer goods results from the conventional methods of handling same. The present invention is directed to the removal of certain of the above-noted impediments in the flow of commerce by the provision of improved handling methods and apparatus for materials such as packaged items and the like.

The present invention is particularly directed to the minimization of the manual operations involved in the flow of goods from the ultimate manufacturer or distributor to the consumer. Although a wide variety of applications of the present invention are possible, in the interests of clarity of disclosure there is herein chosen a single application of the invention wherein same has particular and outstanding utility. Thus, consider, for example, the instance of a retail grocery store wherein a very large variety of separate items are normally stocked for sale to the consumer public. Such items are conventionally received in crates or cartons containing a plurality of like items. It is normally necessary in the stocking of the store facilities for operators to open the cartons or crates of individual items and to remove each separate item therefrom and to place same individually upon the display shelves and stacks of the store. During this stocking operation of the display shelves, it is also normally necessary for the operator to transcribe a price upon each separate item in order that the checkout personnel may appropriately register and charge the customer for the item purchased. Not only are the foregoing manual manipulations normally required in the stocking of store facilities, but also it is periodically necessary to remove certain groups of the individual items of their particular class from the display shelves and stacks of the store in order to revise the retail prices thereon, inasmuch as such retail prices normally fluctuate during the period in which an individual item is stocked in the store. Because of the necessary handling of each item, and quite often rehandling thereof, it is common for goods to be stocked upon shelves upon shelves rather than in floor displays in order to minimize the manual effort involved in the stocking of the store. While this type of shelf display has certain advantages, numerous disadvantages also attach thereto. For example, shelf displays are not as economical of floor space as floor displays, and thus the maximum stocking of the store in accordance with the floor space available is not possible of realization with conventional shelf stocking. Although floor stocking is known, the present invention further encourages same by eliminating certain disadvantages thereof.

In addition to the above-noted manual manipulations involved in the stocking of the individual items upon shelves of a retail grocery store, there is also involved the manual operations of checking-out the items at the time of purchase thereof. It is conventional for a single purchaser to gather together a substantial number of different items from the store display for purchase at a single time, and it is necessary for the checkout personnel to examine each of the individual items in order to find the price marked thereon and to then enter this price upon a conventional cash register which is operable to produce a sum total of the prices registered thereon. It will be readily appreciated that this checkout procedure has various serious drawbacks including the inefficiency of the required searching for the price written upon the individual item and the often encountered difficulty in deciphering such price. Furthermore, the purchaser is provided with only a list of prices and no indication of the individual item to which they pertain other than the bag or box of groceries which has been purchased. In addition to the foregoing, there is involved a requisite periodic inventory of the goods stocked in the store, and it is normally required that this inventory be carried out during a period in which the store is closed to customers. Not only is the process of taking inventory a time-consuming one wherein a large amount of employee time is consumed in individually counting the items in stock upon the shelves, but also the necessary period of closure of the store is highly undesirable from the sales standpoint.

The present invention obviates in whole or in part substantially all of the above-noted difficulties evolving from the repeated handling of individual items in a store or the like as is conventional. In accordance herewith, the individual items need not be separately placed upon shelf displays within the store nor need they be individually marked as to the retail price to be charged in such store. By the removal of these requirements it becomes possible to employ both shelf and floor displays wherein a maximum utility of the available store area may be achieved. Not only is the manual labor of affixing individual price markings to each separate item in the store herein precluded, but also the former difficulties of searching for and deciphering the price markings upon individual items at the checkout stand is likewise precluded. It is herein possible to rapidly and efficiently record the individual items being sold and to produce an itemized list of such items together with the separate prices therefor with a total price indication for provision to the customer. Handling procedures are thereby materially speeded up with a substantial saving in time and expense, as well as the provision of improved service to the purchaser. Along with this efficient price, stocking, and sale of items, there is provided for the automatic and continuous inventory of items stocked and sold so that the previously required expensive inventory procedures are no longer necessary. Not only is the expense of conventional inventory taking precluded, but also there is provided a substantial continuous inventory check which is available as a guide to reordering and as an aid in determining the advisability of stocking or restocking particular items.

As a further portion of the present invention, there is provided semi-automatic accounting apparatus particularly adapted to the utilization in the material handling method of this invention. Although it is possible to employ other apparatus to this end, particular advantage is attained by the utilization of the herein disclosed item accounting and pricing apparatus. In brief, such apparatus includes a register for recording coded indicia of each item handled, such coding forming a part of the item label. Such recorded indicia are automatically and electronically compared to the indicia for each item stocked to the store and retained upon a memory unit having the store retail price associated with such indicia. As a result of this comparison there is produced, preferably in printed form, a visual indication of the code and the price associated therewith together with a total of such prices. The memory unit aforementioned is adapted to receive and retain at the store coded indicia for each of the items stocked therein, together with the price to be charged therefor at such store. Control over the information provided such memory unit is afforded at the store itself. In addition to the foregoing, there is provided a totalizer which continuously counts and records the number of each coded item registered as sold so that there is provided a running inventory of items sold to thereby provide the store operator or manager with full and continuous information, not only upon the total store inventory, but furthermore upon the relative sales of particular items stocked. The apparatus hereof is adapted for operation with a large plurality of separate registers and read-out or printing units. Only a single memory unit is herein required to operate a large number of checkstand units so that a minimum expense is involved in the installation.

It is therefore an object of the present invention to provide an improved method and apparatus for handling materials in which the above-noted difficulty of material handling is substantially overcome.

It is another object of the present invention to provide an improved and simplified method and means for the pricing of items.

It is another object of the present invention to materially reduce the manual handling operations involved in the commercial flow of individual items such as packages and cans or the like, as is conventionally experienced in the warehousing, storage, and sales operations of such items.

It is a further object of the present invention to provide for the material speedup of the movement of goods into and out of concentration and distribution points therefor.

Yet another object of the present invention is to provide for the recording of the inventory of materials such as packaged and canned items in warehouse, storage and retail outlet areas to maintain a current record of the inventory of each item handled.

Still another object of the present invention is to provide apparatus for registering code markings of items for comparison thereof with corresponding prices for such coded items and to provide from such comparison both the identifying code marking and corresponding price in printed form together with a totalization of the prices registered.

Various other possible objects and advantages of the present invention will become apparent to those skilled in the art from the following description of the method and apparatus of the present invention. Although the invention is hereinafter disclosed in connection with particular application thereof and in terms of specific steps and mechanical embodiments in the interests of clarifying the disclosure, it is not intended to limit the invention to the precise terms of the description, and instead, reference is made to the appended claims for a precise delineation of the true scope of the present invention.

The invention is illustrated in the accompanying drawings, wherein:

FIG. 4 is a circuit diagram of the circuit of the present invention illustrated in block form in FIG. 3.

Figure 1:
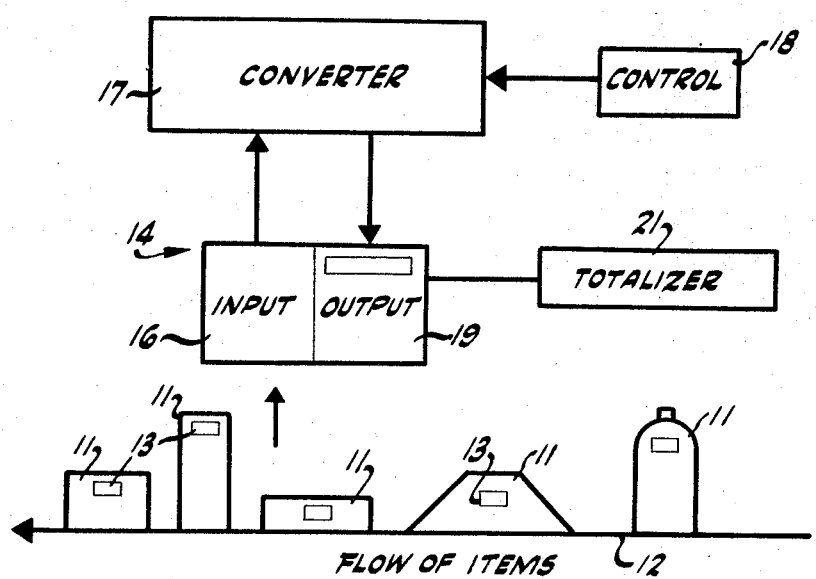
FIG. 1 is a schematic representation of the method of this invention.

Considering first the improved method of handling material in accordance with the present invention and referring first to FIG. 1 of the drawings, there is shown a plurality of items 11 such as, for example, grocery store merchandise. These items 11 are indicated at 12 as flowing past a check point such as, for example, the conventional check out stand of a retail store, Upon each of the individual items 11 there is provided a code marking, as indicated by the rectangle 13 thereon. Such code markings 13 are applied to the individual items at a conspicuous point thereon, as upon the item label. Each different kind and type of item has a separate code indication affixed or attached thereto, and these code markings are preferably supplied by a central agency to the manufacturer and are printed as a part of the item label. Thus, for example, in the processing of canned vegetables, the processing agency will affix labels to the cans identifying the contents thereof for the convenience of the ultimate purchaser and such labels will include a code marking appropriate to the particular contents of such can. Separate code markings are provided for each different type of vegetable canned, size, and grade of vegetables canned, and size of package or can in which such vegetables are preserved. Consequently, each individual item that may possibly have a different price or which for any reason may be considered to be in some manner different from other items distributed and sold will have a different code marking thereon. Listings of code markings and items corresponding to each are provided by the above-noted central agency to the user, such as retailers.

In the instance of the utilization of a method of the present invention in a retail grocery store, the flow of items 12 will normally occur through a checkstand of the retail outlet, and at such point there is provided an input-output unit which may be broadly considered as a register 14. This register 14 includes an input unit 16 having thereon a code keyboard wherein the code markings upon the individual items flowing past the register maybe manually or otherwise registered as input signals. In connection with the register 14 there is provided a converter unit 17 which receives the coded input signals from the input of the register 14. This converter 17 includes a memory function and is adapted to receive and retain corresponding gate and price indicia from a control unit 18 and operates to produce an output signal comprising the code input from the register 14 together with the corresponding price which has been previously inserted and retained by the converter. The output of the converter 17 is applied to an output unit 19 of the register 14. This output unit may visually indicate both the code marking and corresponding price, and also preferably provides a printed record of same together with a totalization of the prices of all of the code input for an individual transaction. By the utilization of the above-noted code markings upon each of the individual items flowing past a check-point, it is possible for an operator to easily identify the individual item by the code markings upon the items and to operate the input keyboard to insert such code markings into the register 14. The code markings are formed of sufficient size and colors and are so positioned upon the individual items as upon the labels thereof, that they are very readily seen by the operator so that the identification of such code markings is materially simplified. Also, the one handling the items may remember the code markings, as same do not change for any one item, rather than prices thereof which continually change. With the insertion of such code markings into the input 16 of the register 14, there automatically is produced at the output 19 of this register not only the corresponding price of such code marking but also the code marking itself. From the output of the register 14, there will be seen to be produced a record not only of the individual prices and a total thereof but also, a corresponding identification of the item to which the price corresponds. In contrast to conventional checking techniques, the method hereof is materially simplified, for the person handling the operation need only enter the readily visible code markings to produce a complete record of the sales transaction. Not only is the visibility and legibility of the entry upon the item materially improved over conventional practices wherein such as grease pencil writing or the like is employed, but furthermore the burden of remembering individual prices is removed from the operator. Although an individual item will always arrive at the checkout point with the same marking thereon, it is herein possible to change the price corresponding thereto in accordance with local desires by utilizing the control unit 18 which may be located in the vicinity of the handling operation, such as for example, within the retail outlet. Complete control over the ultimate prices is thereby afforded to the retailer in the above-described example of the invention. In addition to the simplification of the handling operation, there is produced a materially improved record of the transaction, for the printed record includes the item identification with corresponding prices so that the purchaser or receiver of the items may personally check the inventory of goods handled at a later date. As applied to sale operations, such as for example, retail grocery stores, it will be seen that the above-described method provides a material simplification and speedup over conventional handling operations. Various burdens are removed from the persons involved in the handling operation and transferred to apparatus and circuitry which is not subject to human error. Various other side benefits are also achieved by the utilization of this method for price marking of items within the retail outlet is herein precluded. It is only necessary when utilizing this method of handling materials for the retailer to provide a single price indication for a large plurality of identical items stocked, as by signs or the like, and no separate manual handling of each item for the application of the price marking thereto is required.

As a further portion of the method described above, there may be provided for the continuous totalizing of items handled. To this end there may be provided a totalizer 21 that may physically form a part of the converter but which is shown connected to the output 19 of the register 14. This totalizer 21 operates to provide a running count of each code marking registered so that there is provided a continuous inventory of items handled. With an initial inventory of stock, this continuous inventory of items subtracted therefrom will provide an up-to-date total inventory of stock on hand. This serves to remove the necessity of periodic and time-consuming manual inventories of stock and thus consequently provides a material advantage in the handling of items or goods.

Figure 2:
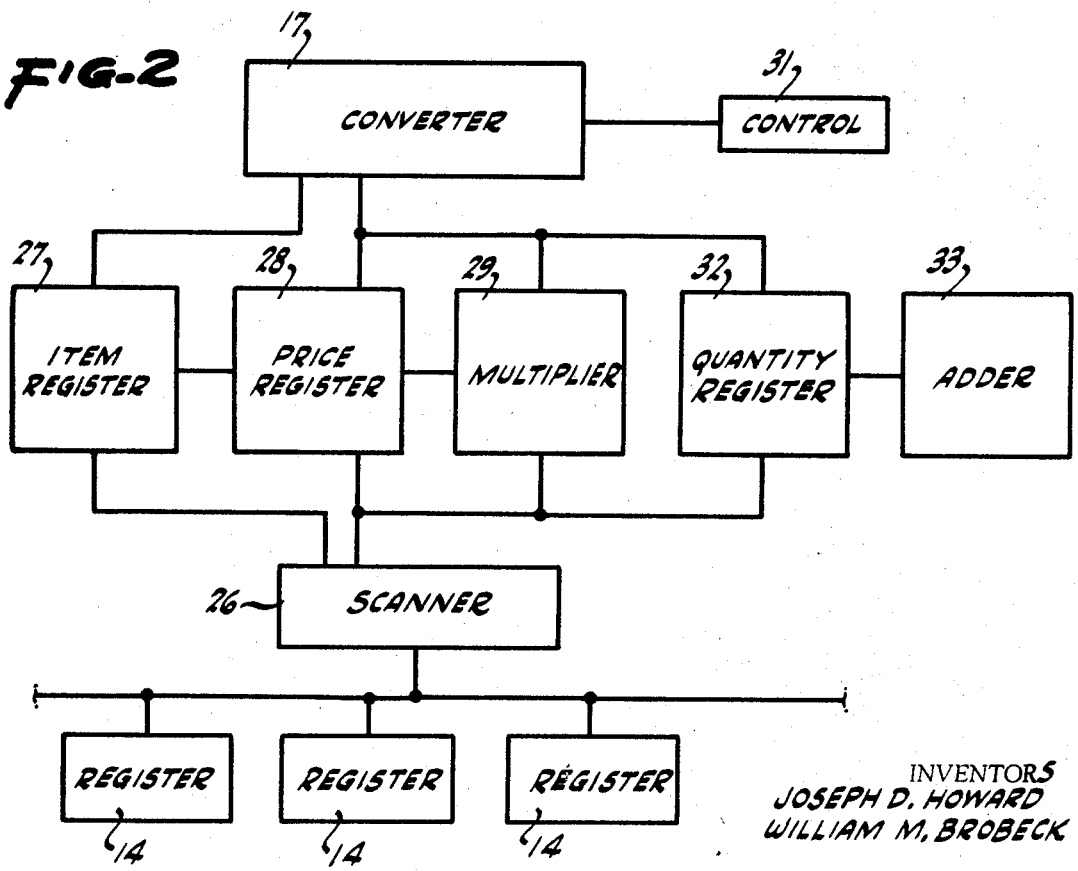
FIG. 2 is a block diagram of the apparatus of this invention.

Considering now a circuit adapted to perform certain of the functions set forth in the method above, reference is made to the single line diagram of FIG. 2 wherein there is illustrated a block diagram of such a circuit. In order to minimize the complexity and cost of the circuitry employed in the present invention, there may be utilized a large plurality of individual registers 14 with a single converter and control means. Thus, as shown in FIG. 2, a number of registers 14 are shown connected to a scanner 26 which serves to relay input signals from the registers 14 to the remainder of the circuit and also to return output signals to the registers 14 therefrom. Inasmuch as the converter and other portions of the circuit hereof operate extremely rapidly to produce desired output signals in response to particular input signals, it is possible to receive input signals from a plurality of registers and to operate thereon with a single converter and associated circuitry. This feature provides a substantial saving in the complexity and resultant cost of the present invention. The scanner 26 supplies code signals to an item register 27 which operates to compare the input code signals to each of the item codes upon the converter 17. This converter 17 includes a memory unit, as described below, upon which there is impressed corresponding code signals and price signals in ordered sequence. Upon the coincidence of a code signal on the converter with an item code on the item register there is transmitted from the converter signals including both the code signal and price signal. This output from the converter 17 is applied to a price register 28 which only registers price signals corresponding to coincident code signals. A multiplier circuit 29 is connected to the price register 28 to multiply the price register information by the number of items of the particular code signal handled so that the output of the price register, as applied to the scanner 26, includes a total price for the complete number of particular code items entered in the input of the register 14. The scanner 26 periodically connects each of the registers 14 to the item and price registers so as to thereby return price information to these registers for indication at the visual and printed output thereof. Information is originally applied to the converter 17 by a control means or circuit 31 which preferably contains at least a price keyboard and it may also contain a code keyboard to apply signals to the converter for retention thereby. The converter 17 may also be provided with price information corresponding to a plurality of items sold for a combined price. To initially apply code and price signals to the converter or to change the price of an item code already retained by the converter, the control unit 31 is employed. With this control unit 31 including both a price and code keyboard, the item code word is set up on such keyboard and is applied to the converter which searches for same in the retention portion thereof. At the same time the item code is set up on the control keyboard, the price is likewise set up upon the price keyboard thereof so that if the item code is found in the converter, the price signal is applied to the converter at exactly the same point in the cycle of scanning thereof. If the item code is not found in the converter, the item code and the price information are both recorded upon the converter at an empty memory slot therein. The control circuit 31 is preferably also supplied with readout means such as the output portion of the register 14. Thus the control unit 31 may be employed to determine the price of any particular code by entering the code upon the code keyboard thereof and reading the price indicated at the output portion of the control unit. Additionally, advantage may well lie in the provision of a complete readout feature wherein a single switching operation provides for the recording at the control unit of all information retained by the converter.

An inventory control feature may also be incorporated in the circuit of FIG. 2, and such is therein indicated as a quantity register 32. An original number of each of the code items may be inserted in the quantity register and by connection of the register to the output of the converter 17 there will be provided at the register an indication of each of the code items handled. A subtracting circuit 33 connected to the quantity register then subtracts the number of each code item handled from the total number provided the register so that the register at all times reads the total remaining number of code items. There will thus be seen to be provided a continuous running inventory of stock items which is available at the quantity register 32.

Operation of the circuit of FIG. 2 is accomplished by the entering of code markings from individual items handled upon the registers 14. The scanner 26 operates to successively connect the item and the price register successively to each of the registers 14. At the time an individual register 14 is connected through the scanner to the item register the converter unit 17 successively compares code markings thereon with the code at that time carried by the item register, and at the same time the price register may read each price corresponding to the code markings being compared. The price register may successively erase each price reading until the comparison being carried out between the converter and item register produces an identity; at this point the price register fails to erase the reading and consequently passes same back through the scanner to the corresponding register 14 from which the original code was received. Rapidity of operation is enhanced by the provision of means for producing a multiplying action in the price register 28 so that it is possible to enter upon the input of the register 14 a code marking and a number corresponding to the number of items of such marking which are being handled. The price register 28 then operates to multiply the price retained thereon by such number to provide through the scanner a total price corresponding to the number of code items handled. As regards the time of operation, a complete comparison of a code marking from the item register with all code markings retained by the converter 17 may be accomplished in a minute portion of a second. With the converter 17 including a rotating magnetic drum memory unit, the speed of rotation may be 3,600 rpm so that a scanning of the entire code system therein retained may be accomplished in one-sixtieth of a second. Inasmuch as this comparison operation takes such a small period of time it is thus possible for the system to be operated with a large number of registers 14. The speed of entry of code indicia upon these registers 14 is limited by manual dexterity of the operator and can hardly exceed ten code indicia per second so that adequate time is available for the connection of a large number of registers through a single scanner to the above-described circuit. No noticeable delay is realized at the registers 14 by the connection of a plurality thereof to a single converter. A wide latitude of control operations is herein possible and the system lends itself admirably to the utilization of automatic control means. For example, it is possible to employ punch cards containing price and code information which may then be inserted in the control unit and then automatically serve to supply such punched information to the memory portion of the converter 17. In this manner the possibilities of human error and the degree of clerical work involved are materially minimized. Likewise, the output of the system may be supplied to other locations besides the registers 14. Thus, for example, information as provided at the quantity register 32 may be automatically transfered as by telephone line to a distant control and accounting station and from which there could be calculated the rates of turnover, effects of price changes, profits on each item and total profits, as well as a multitude of basic information upon which operating decisions could be based. The availability of such information at all times certainly leads to more well founded decisions regarding the handling of items in such as a large system of retail grocery stores.

The circuit illustrated in FIG. 2 of the drawing does not specify units which would normally be included in order to change the codes employed and the decimal system employed to the binary code which would normally be utilized in the memory portion of the converter 17. Substantially conventional circuitry may be employed in the blocks illustrated in the circuit of FIG. 2, although advantage lies in the utilization of particular circuitry set out in FIGS. 3 and 4 of the drawing. As regards the particular code markings to be applied to the individual items which are handled and recorded in accordance herewith, there may be employed a system of alphabetical letters, a system of numbers, a system of hieroglyphics, or a combination thereof. The use of an alphabetical code has certain advantages inasmuch as an operator would readily recognize the individual letters of the code and thus experience less difficulty in depressing the appropriate keys upon the input keyboard of the register 14.

There may be employed an item code utilizing 24 letters of the alphabet. Each item code word may consist of five of these 24 letters and with this code arrangement there are some 7,962,624 different code combinations. This number most certainly is adequate to provide for all of the items available from all of the manufacturers in one field of commerce with adequate allowance for unused or obsolete items. The code and price indications may be recorded upon a rotary magnetic memory drum which may, for example, be rotated at 3,600 rpm. As regards the required size of such a drum, a binary system of recording is conventional and some 23 circumferential columns on the drum would be adequate to record the above-noted code combinations with some 8,200 longitudinal rows upon such drum. Recording of prices from zero to $9.99 would require an extra 10 circumferential columns on the drum and provision for the indication of combination prices may raise the total number of columns to 36. Such a drum would provide for the recording to some 300,000 bits of information as a maximum capacity thereof. The provision for recording inventory information upon the memory drum would further increase the necessary storage total thereupon, and information on about 2,000 units of each of some 8.000 items possibly stocked would require the addition of about 11 more columns on the drum to provide a total of 47 thereon. This would then provide for the drum to record and retain about 4,000,000 bits of information. Such memory drums are quite conventional and may be commercially obtained. Such a drum might have a diameter of about 26 inches and a length of about 8 inches. As regards the operator, an experienced keyboard operator could hardly depress the keys faster than ten per second and with the depression of five keys for each code plus one further key for the number of items of such code, a complete entry could only be made every six-tenth second by a single operator. During this time a drum rotating at 3,600 rpm would have rotated 36 revolutions, and, inasmuch as each bit of information is available once each revolution of the drum, some 36 operators could utilize a single drum of this type.

Figure 3:
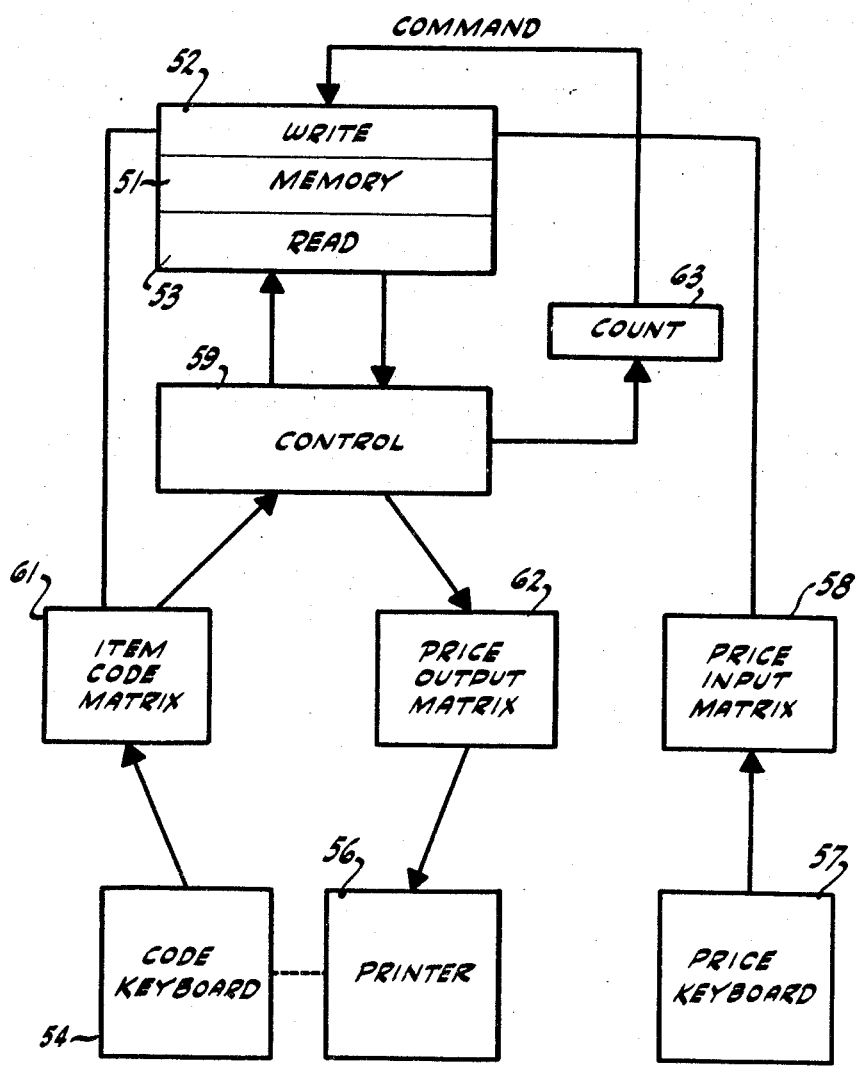
FIG. 3 is a block diagram of a simplified circuit of the present invention as illustrated in greater detail in FIG. 4.

It will be appreciated that various control circuitry is associated with the block components of the circuit of this invention and a further and better understanding of the circuitry of the present invention may be obtained by a consideration of the simplified illustration thereof in FIGS. 3 and 4 of the drawings. In the interests of simplicity the embodiment depicted therein does not include connections for a plurality of separate registers 14 and associated scanner 26 for individually and consecutively connecting the registers to the memory and control portion of the circuit. Additionally, the automatic inventory circuitry is eliminated from the circuit diagram of these figures in order to more particularly point out therein certain portions of the present invention which might otherwise be obscure. As may be seen from FIG. 3 of the drawings, the converter portion of the circuit includes a memory unit 51 together with associated writing unit 52 and reading unit 53. This memory unit may include a conventional magnetic memory drum of the type commercially available and the associated writing and reading units are also normally provided by manufacturers of the memory drums. The circuit basically includes a code input keyboard 54 together with a mechanically connected printer 56. By the utilization of a single unit embodying both the code input keyboard and printing unit, it is possible to provide mechanical interconnection whereby the code input is printed at the printer together with price information received from the memory unit without the necessity of additional circuitry for applying electrical code impulses to the printer for printing thereof. The code input keyboard and printer are normally positioned at a point of handling materials so that an operator will have ready access thereto for depressing appropriate keys on the keyboard thereof corresponding to code markings on individual items being handled, and also will have ready access to the printed record of the item code and corresponding price. A further input unit provided for the circuit of this invention is a price keyboard 57 which is normally physically located at some control points, as for example, in the manager's office of a retail outlet. The price keyboard is adapted to be operated by the depression of appropriate price keys whereby the keyboard produces an output signal corresponding thereto and a price input matrix 58 receives such signals and transforms the decimal system signals into a binary system of signals. Inasmuch as memory units of the type herein contemplated conventionally operate upon a binary system, it is advantageous to employ the binary system throughout the circuitry. Output signals from the price input matrix unit 58 are applied to the writing unit 52. In this illustrated embodiment only a single code input keyboard is illustrated and thus in operation of this circuit the item code would be applied to the code input keyboard and the corresponding price applied to the price keyboard. In more extensive installations, a separate code input keyboard would normally be provided in physical juxtaposition with the price keyboard for convenience of inserting information into the memory unit 51. The code input keyboard 54 is adapted to produce electrical signals which may correspond to the keys depressed thereon and, in conformity with general cash register practices, a start button or count button may also be provided upon the code keyboard so that following the depression of appropriate keys corresponding to the item code this start button is also depressed whereby the signals corresponding to the depressed keys are produced as an output of the code input keyboard. At item code matrix 61 of conventional matrix design is connected to the code input keyboard and serves to transform or convert the code signals into corresponding signals of a binary system. The item code matrix 61 may convert 24 input signals to some 25 logic signals in the binary system and is connected to the writing unit 52 and is also connected to control circuitry 59 which in turn connects to the reading unit 53 associated with the memory drum. It is herein contemplated that there shall be recorded upon the memory drum 51 item code signals and corresponding price signals and the control circuitry 59 includes suitable coincident circuitry whereby a coincidence between the input item code and the item code produced by the reading unit 53 will serve to pass price signals from the reading unit to a price output matrix 62. Thus, with the memory unit drum continuously rotating, signals are continuously being produced from the reading unit 53 corresponding to item code signals recorded thereon. At the time the code input keyboard 54 is actuated and a particular item code is transmitted therefrom to the control circuitry 59, a comparison is made between the signals from the reading unit and input item code. At such time as the memory unit is so positioned that the reading unit produces the item code which has been inserted on the code input keyboard 54, price signals also produced by the reading unit will be passed by the control circuitry 59 to a price output matrix 62. This price output matrix 62 serves to convert the binary price signals to the decimal system so that the printer receives therefrom such signals as will actuate the printer to record as upon a tape the price corresponding to the input item code. With the code input keyboard 54 and the printer 56 being mechanically interconnected, the input item code is also provided to the printer 56 so that the latter unit prints the item code and the corresponding price as received from the memory unit. As regards the insertion of information into the memory unit, both the code input keyboard 54 and the price keyboard 57 are utilized. With an item code inserted in the code input keyboard and with a corresponding price applied to the price keyboard, the start button is depressed at the code keyboard so that the control circuitry 59 searches for this item code upon the memory unit. Failure to find the item code will cause both the item code and price to be applied to an empty portion of the memory unit. Finding of the code causes a signal to be applied to the control circuitry which, in turn, produces a signal which is applied to a counter circuit 63 to thereby initiate the counting action therein.

Counting is continued for the number of rows upon the memory unit separating the writing unit and the reading unit, and upon the completion of this count there is produced a command signal from the counter 63. This command signal serves to actuate the writing unit so that code input signals applied thereto and price input signals applied thereto will be impressed upon the memory unit. Suitable means are also provided for printing this input item code and the corresponding price as a check against the proper insertion thereof upon the memory unit.

Insofar as certain of the circuits illustrated in FIG. 3 are concerned, same are quite conventional and may be readily purchased on the commercial market. Thus the keyboard units and printer are not unique to the present circuit. Likewise, the item matrix, price output matrix and price input matrix are only particular applications of well known matrix circuitry. The actual number of units employed in each of the illustrated matrixes depends upon the number of characters in the code employed and the number of decimal units afforded in the price portion of the invention. The item code matrix, for example, may in the instance wherein a 24 character code is employed, be formed in five sections with each including some 120 diodes connected in relatively conventional fashion so as to produce binary signals in one or the other of each conductor of some five pairs thereof upon the receipt of signals in the input code system. Both the price output matrix and the price input matrix may also be conventionally designed in accordance with well known matrix principles as by the utilization of some 40 diodes in each section thereof. It will be appreciated further that the block diagram of FIG. 3 is somewhat simplified insofar as the connections are shown, inasmuch as in general only single lines are therein employed to illustrate electrical connections. This type of illustration is not intended to convey the impression that single electrical conductors are utilized in the connections illustrated. A more complete and detailed description of the circuitry of FIG. 3 may be found in FIG. 4, and a brief description thereof follows.

There is illustrated in FIG. 4 of the drawings, certain of the circuitry included in the block diagram of FIG. 3, described above, and in particular the control circuitry thereof. The circuit illustrated in FIG. 4 is limited to a single code input keyboard and price output printer in order to simplify the circuit description and also various other minor simplifying designs are incorporated wherein only conventional circuitry is involved in order to further clarify the explanation. Referring now to FIG. 4, there is shown a conventional magnetic memory drum 51 having a writing unit 52 and a reading unit 53 associated therewith. As above noted, there is included in this circuit but a single code input keyboard 54 and a single printer 56. As in FIG. 3 described above, there is also provided a single price input keyboard 57 connected through a price input matrix 58 to the writing unit 52 of the memory drum. Both the code input keyboard 54 and the printer 56 are directly connected to matrix circuit 61 and 62, respectively. All of the matrix circuits illustrated in block form in FIGS. 3 and 4 are quite conventional in design and are provided for the purpose of conversion from and to a binary system which is employed on the memory drum 51. In the circuit illustrated in FIG. 4 there are employed a plurality of direct-coupled multivibrator circuits with two conditions of stable equilibrium, commonly termed flip-flop circuits, and a plurality of conventional gate circuits. Concerning the operation of conventional flip-flop circuits as herein employed, it is noted that such circuits or devices have two stable states commonly denominated as "set" and "reset." The circuits or devices are provided with a pair of set terminals and a pair of reset terminals and the application of a pulse to the set input terminal will produce a steady signal from the set output terminal while an input pulse at the reset input will reverse this condition so that the output from the set output terminal will disappear and a steady-state signal will be supplied from the reset output terminal. The gate circuits herein employed are of two conventional types commonly denominated as "AND" gates and "OR" gates. The AND gate circuits have a plurality of inputs thereto and operate to produce an output signal only upon the simultaneous application of input signals to each of the input terminals thereof. The OR gates, or gate circuits, operate to pass pulses that arrive at any of their inputs, and none of the above-described three elements or circuits pass signals in the reverse direction. By the utilization of these simple basic circuit elements or devices it is possible to produce a relatively inexpensive and compact overall circuitry, particularly when the circuits or elements described above are formed with transistors. The flip-flop circuits and gate circuits employed in the overall circuitry hereof are commercially available, and furthermore, suitable conventional amplifiers may be inserted at such points in the circuit as may be desired for optimum operation thereof under particular circumstances. These amplifiers are herein excluded from the illustration in order to reduce the complexity of the drawing and to further promote the under standing thereof.

The writing unit 52 associated with the magnetic drum 51 includes a plurality of conventional writing heads 71 which may, for example be separated some 180° about the periphery of the drum from a plurality of reading heads 72 forming the reading unit 53. As above noted, the magnetic memory drum is conventionally constituted in containing a plurality of circumferential columns on which information may be magnetically recorded and also including a plurality of longitudinal rows including the individual portions of such columns and along which there is recorded corresponding information, in this case both code and price information. In addition to the plurality of reading heads 72 provided for the purpose of producing electrical indications of information recorded upon the memory drum, there is provided a turn indicator head 72' producing an output pulse for each complete revolution of the drum and a row indicator head 72" producing an output pulse for each row of the drum passing thereover during drum rotation. All of the reading heads are physically identical; however, the particular purpose for which the turn indicating head and the row indicating head are herein employed differs to such an extent from the purpose of the remaining multiplicity of reading heads that same are separately identified. As above noted, information is recorded upon the magnetic drum in a binary system with the matrices 58, 61, and 62 being provided for conversion between such systems and both code and decimal price systems employed at the keyboard and printer. Each of the reading heads 72 is adapted to produce signals corresponding either to the one or zero units of the binary system employed to record information upon the magnetic drum 51. The connection of each of the reading heads is identical, and considering a single head, same will be seen to be connected to three AND gate circuits 74, 76 and 77 through a suitable amplifier, not shown. The one signal lead from the reading head amplifier is connected to one of the inputs of each of the AND gate circuits 74 and 77, while the zero signal lead from the reading head amplifier is connected to an input of the AND gate circuit 76. Additional input signals are provided to the AND gate circuits 74 and 76 from the item code matrix 61. The item code matrix 61 may comprise a conventional five element matrix converting such as a 24 character code into a binary code. The item code keyboard 54 may include a mechanical register which stores the item code up to five successive key depressions, in a conventional manner, and information may be transmitted from the code input keyboard to the item code matrix by means of a plurality of conductors, such as for example, five groups of 24 conductors each. Only two conductors 78 and 79 are illustrated as extending from the item code matrix to the writing and reading heads although the remainder of the item code matrix output conductors also extend to separate writing and reading heads of the memory unit in pairs. With a binary system, the two leads 78 and 79 are sufficient to carry a one and a zero signal indication for one digit of the binary system employed in the memory unit. Connection is made from the conductor 78 to an input of the AND gate 74 and from the conductor 79 to an input of the AND gate 76. In the instance wherein a one signal is transmitted from the item code matrix 61 through the conductors 78, such signal will be applied as an input to the AND gate circuit 74 so that upon a coincident signal in the one conductor extending from the reading head to this gate circuit there will be produced an output from the AND gate circuit 74. The output from each of the AND gate circuits 74, 76, and 77 are connected to the input of an OR gate circuit 81, so that in the above-described example the output of the AND gate circuits 74 will pass through this OR gate circuit 81 and thence on to one input of an AND gate circuit 82. In the instance wherein the magnetic memory drum 51 is provided with 25 item code reading heads, in accordance with the previously suggested example, there may be provided a single AND gate circuit having twenty-five inputs or two other AND gate circuits 83 and 84 with the outputs of each of these circuits being connected to the input of another AND gate circuit 86. In this instance each of the three AND gate circuits 82, 83, and 84 is provided with a plurality of input connections, each connected in the manner described above for the first reading head of the item code portion of the magnetic drum. The passage of a signal through the above-described circuit including the AND gate circuits 74, 76, and 77 and the OR gate circuit 81 from the reading head 72 corresponds to a coincidence of the signal from this reading head and that called for by the first channel of the item code matrix 61. At the point of rotation upon the memory drum wherein a similar coincidence occurs on all 25 item code reading heads, compared with all of the 25 output channels of the item code matrix, there will be present an input signal at each of the inputs of the three AND gate circuits 82, 83, and 84 so that there will then be produced a coincidence of input signals to the AND gate circuit 86. The output from the AND gate circuit 86 resulting from the above-noted coincidence of input and recorded code signals is applied to a line or conductor 87 for operation of further portions of the circuitry described below. As regards the other AND gate circuits 76 and 77 connected to the first item code reading head, the AND gate 76 functions in a manner similar to the circuit 74 providing same is receiving a signal from a conductor 88, as described below. AND gate circuit 77, however is connected between one of the reading head leads and a conductor 89 so as to operate only during writing operations, also described below.

The signal upon line 87 resulting from a coincidence between the code signal supplied by the item code matrix and the code signals upon the memory drum 51 is employed to control the signals applied to the printer 56 relating to price information corresponding to the code inserted upon the code input keyboard 54. In the example wherein twelve columns of information are provided for upon the magnetic memory drum to record price information, there are provided some twelve price reading heads 72, and as shown in FIG. 4, connection is made from each of these heads to a pair of AND gate circuits 91 and 92 which have the other inputs thereof connected to a conductor 93. In the instance wherein a signal is present upon the conductor 93, the AND gates 91 and 92 will successively conduct in accordance with the signals received from the reading head and pass signals to the set and reset input terminals respectively of a flip-flop circuit 94. The set and reset output terminals of the flip-flop circuit 94 are connected to the input of the price output matrix 62. Control of the recording of price information received from the price reading heads is afforded by the provision of a flip-flop circuit 96 having a set input terminal connected to the of an AND gate circuit 97, with one input thereof being connected to the conductor 87. The other input of the gate circuit 97 is connected to a conductor 98 leading to certain circuitry described below. Another AND gate circuit 99 is provided with one input thereof connected to the conductor 87 from the code reading heads and with the other inputs connected to a conductor 101, also extending from circuitry later to be described. The output of this latter gate circuit 99 is connected to the movable contact of a switch 102. This switch is provided with stationary write and read contacts, with the read contact being connected to the input set terminal of the flip-flop circuit 96. With the reset input terminal of the flip-flop circuit 96 connected to a reset terminal of the printer 56 and, furthermore, with the set output terminal of the flop-flop circuit 96 connected to a print terminal of the printer 56, it will be seen that the simultaneous presence of signals upon the conductors 87 and 101 will operate to actuate the flip-flop circuit 96 into conduction through the set portion thereof whereby the printer is signalled to record and print input signals thereto while at the same time the conductor 93 is deenergized so that the flip-flop circuit 94 remains in either set or reset position last attained. The set output of flip-flop 97 may be connected also to a gate circuit 100 at the price output matrix 62 to cause price signals to be passed to the printer 56, or a comparable function may be accomplished in the printer.

As above noted, the circuit hereof is adapted to provide for the printing of price information corresponding to code information inserted in the circuitry and also to provide for the writing of corresponding information upon the memory drum 51 of the circuit. Means are provided for controlling the particular operation which is carried out by the circuit hereof, and such means includes an addition to the above-noted switch 102, the switches 103 and 104. Each of these latter named switches has both read and write stationary contacts thereon with a movable contact adapted for engagement with one or the other thereof and in a practicable embodiment of the illustrated circuit these three switches 102, 103, and 104 may, in fact, be physically combined so that a single operation will service to actuate each of the switches. Further to the control of the operations performed by the above-described circuit, there are provided five flip-flop circuits 106, 107, 108, 109, and 110. A start button 111 is connected to the positive terminal of a grounded power supply 112 and also coupled through a capacitor 113, that is shunted to ground through a resistor 114, to the set input terminal of the flip-flop circuit 106. Thus, upon actuation of the start button 111 a positive voltage signal will be applied to the set input terminal of this flip-flop terminal 106 to thereby produce an output from the set portion thereof. Such set output terminal of the flip-flop circuit 106 is connected to the input of an AND gate circuit 116, with another input thereto being connected from the reading head 72'. The output of this AND gate circuit 116 is connected to the input set terminal of the flip-flop circuit 107 and the output set terminal thereof is connected to another AND gate circuit 117. The output of this AND gate circuit 117 is connected to the movable contact of the switch 103 which has the read contact thereof connected to a common conductor 118 joining together the input reset terminals of the flip-flop circuits 106, 107, 109, and 110. This conductor 118 is also connected through a capacitory 119 and a switch 120 to the positive terminal of a grounded power supply 121. It will be seen that by this connection of the common reset conductor 118 through the switch 120 to the power supply 121, closure of the switch 120 will serve to apply a voltage signal to the flip-flop circuits 106, 107, 109 and 110 to place each of these circuits in its reset position. The switch 103 has the stationary write contact thereof connected to one input of an AND gate circuit 122, the other input thereof being connected to the reset output terminal of the flip-flop circuit 109. The output of the AND gate circuit 122 is connected to the set input terminal of the flip-flop circuit 108. The set and reset output terminals of this flip-flop circuit 108 are connected to the above-noted conductors 89 and 88, respectively. As regards the flip-flop circuit 109 the set input terminal thereof is connected to the reset input terminal of the flip-flop circuit 108 and also to the stationary write terminal of the above-noted switch 104. The set output terminal of this flip-flop circuit 109 is connected to one of the inputs of an AND gate circuit 123. Another AND gate circuit 124 is connected with one input thereof coupled to the conductor 89 extending from the set output terminal of the flip-flop circuit 108 and the other input terminal thereof connected together with an input terminal of the AND gate circuit 123 and an input terminal of the above-noted AND gate circuit 117 to the reading head 72'. The outputs of each of the AND gate circuits 123 and 124 are connected to inputs of an OR gate circuit 126 having the output thereof connected to the set input terminal of the flip-flop circuit 110. The set output terminal of this flip-flop circuit 110 is connected to the conductor 98 and also to an input of another AND gate circuit 127. The other input of the AND gate circuit 127 is connected together with inputs of the other AND gate circuits to the reading head 72' while the output of this AND gate circuit 127 is connected to the common reset conductor 118. It will be appreciated from the circuitry of FIG. 4 described above that certain reset output terminals of the flop-flop circuits described remain unconnected, and it will be appreciated that when these circuits are then in the reset condition there is provided no output signal therefrom.

One further portion of the circuit illustrated in FIG. 4 which has not previously been fully discussed as to connections thereof, is the counter 63. Inasmuch as the reading and writing heads of the memory unit are physically separated above the circumference of the drum 51, it is necessary to provide for a predetermined delay before the application of information to the drum at a position indicated by the reading heads when same are employed in searching for such a code existing upon the drum. This function is carried out by the counter 63 and same is connected at an input terminal thereof to the reading head 72" which provides one output pulse for each row of the drum as same passes thereover. The counter 63 is adapted to count these pulses and to produce at an output terminal thereof a signal after the counting of such predetermined number of rows as separate the reading and writing heads. This output signal is applied to a command conductor 131 which is connected to the writing unit 52 and serves to actuate same so that intelligence signals applied to the individual writing heads 71 thereof will be transferred to the memory drum. A start signal is applied to the counter 63 from the write terminal of the switch 102 so that upon the receipt of a start signal from such switch the counter will commence to count input signals received from the reading head 72" until a predetermined number thereof have been counted corresponding to the number of rows separating the reading and writing heads, whereupon the counter 63 will produce an output signal employed as a command signal for the write unit 52. This command signal is also applied to a stop terminal of the counter so that the counting procedure ceases upon the production of such output signal and does not recommence until a new start signal is received. THe write unit 52 includes, as noted above, a plurality of writing heads 71 corresponding in number and position to the reading heads 72. Each of these writing heads is preferably provided with an appropriate amplifier 132 which has the command conductor 131 from the counter 63 connected thereto and which also operates to produce an output signal only upon the receipt of a command signal thereto. The writing heads 71 situated to provide item code information to the memory drum are each connected to the item code matrix, as indicated by the connection of conductors 78 and 79 to the first writing head 71. Likewise, each of the writing heads 71 corresponding to the price reading heads are connected by a pair of conductors to the price input matrix 38, as exemplified by the conductors 133 extending from the last writing head to the price input matrix.

It is herein contemplated that the circuit shall initially be placed in reset condition, i.e., each of the flip-flop circuits of the overall circuit shall originally be placed in the reset condition. The switch 120, noted above, will be seen to serve to provide a signal to the common reset terminal conductor 118 which thereby applies a signal to the input reset terminals of the flip-flop circuits 106, 107, 109 and 110, so that these circuits are in the reset condition. Provision is also made for initially establishing a reset condition of the flip-flop circuit 96 employed to control the printing operation and such provision may take the form of a switch 134 connected to the reset input terminal of the flip-flop circuit 96 in conjunction with the circuit like that associated with the switch 120. As regards the initial setup of the overall circuitry, it is noted that the flop-flop circuits 94 associated one with each reading head, need not be in either set or reset condition, and likewise the flip-flop circuit 108 is controlled as to its original set or reset condition by means other than the switch 120, as described in more detail below.

Considering now the operation of the circuit of the present invention as illustrated in FIG. 4 of the drawings, it is first assumed that the code and price information have been recorded on the drum 51 and that same is being rotated by integral drive means, not shown. The flip-flip circuits are initially maintained in a reset condition by depression of the push button switches 120 and 134, as noted above. The reading heads 72 pick up signals from corresponding tracks from the drum and produce output signals therefrom. These reading head signals may be considered as logical "ones" or logical "zeros" corresponding to positively or negatively magnetized portions of the tracks on the memory drum and representing the two units of the binary system. The output signals from each of the 25 item code reading heads are applied to three AND gate circuits are exemplified by the three AND gate circuits 82, 83, and 84, and the output signals from the price reading heads are applied to pairs of AND gate circuits as exemplified by the gate circuits 91 and 92 in the drawings. A single code-price operation is accomplished by depression of keys on the code input keyboard 54 which stores the item code in the same manner as a ten-key adding machine stores information. With a 24 character code wherein each code word contains five symbols, five successive key depressions are made on the code input keyboard for a single entry and corresponding signals are applied to the item code matrix 61 which operates to convert the 24 character code into a binary code. Considering only the first reading head as exemplary of the operation of each of the reading heads and circuits associated therewith, assume that the code matrix calls for a logical "one" on the channel corresponding to the track read by the first reading head 72. In this circumstance there is provided a signal on the conductor 78 which will be seen to be applied to one input of the AND gate circuit 74 so that on the reading of a logical "one" by the reading head 72 there will be applied two coincident input signals to the AND gate circuit 74, so that a signal is passed therethrough to the OR gate circuit 81. This signal is then passed through such gate circuit and is applied to one of the inputs of the AND gate circuit 82. If coincident signals are received at the gate circuits associated with each of the item code reading heads, there will be applied to the three AND gate circuits 82, 83, and 84 simultaneous signals at each of the inputs thereof whereby the signal will be passed through each of these gate circuits to comprise coincident input signals to the AND gate circuit 86. Such a condition produces an output signal from the AND gate circuit 86 to thereby energize the conductor 87. During the time in which the foregoing occurs, each of the price reading heads produces output signals so that an input is applied to each of the AND gate circuits associated with each of such reading heads. The flip-flop circuit 96 is at this time maintained in a reset condition so that an output signal is applied to the conductor 93 forming the other input signal of each of these AND gate circuits. As regards the last piece reading head illustrated, the AND gate circuits 91 and 92 associated therewith pass signals therethrough in response to the coincident input signals thereto so that the flip-flop circuit 94 connected to these gate circuits conducts through the set and reset portions thereof. In the absence of a signal on the conductor 87 the flip-flop circuit 96 is maintained in a reset condition so that each pulse from the price reading head sets or resets the flip-flop circuit associated therewith; however, when a coincident pulse appears on the conductor 87, in the manner above described, the condition is altered. The energization of the conductor 87 in response to an identity between an input code and the recorded code on the memory drum serves to apply a signal to the set input terminal of the flip-flop 96, in a condition wherein the switch 102 is maintained in the read position, so that the reset signal therefrom disappears and the AND gate circuits 91 and 92 of the price reading head fail to produce an output therefrom. Consequently, the price flip-flop circuit 94 remains in the last conducting state and a signal from the set portion of the flip-flop circuit 96 is applied as a print signal to the printer 56. The last retained price indication is therefore passed through the price output matrix wherein it is converted to a decimal system from the binary code employed in the memory unit and is applied to the printer 56 wherein the price information is recorded. It is noted that the signal from the conductor 87 is applied to the flip-flop 96 through the switch 102 and also through the AND gate circuit 99, so that it is necessary for the conductor 101 to be energized for this condition to occur. Upon the recording of price information at the printer 56, this printing unit produces a reset signal which is applied to the flip-flop circuit 96 to return same to a reset condition so that the circuit is again in condition for receiving further coded input and price information output.

The foregoing operation will be seen to be controlled by the switches 102, 103 and 104 as well as the flip-flop circuits of the overall circuit. It is assumed in this condition that each of the above-noted switches is positioned in the read position and, furthermore, that the start button 111 is depressed to initially place the flip-flop circuit 106 in a set condition. An output signal from the set portion of the flip-flop circuit 106 is applied as an input to the AND gate circuit 116, and the other input thereof is received from the reading head 72' producing one pulse per turn of the magnetic memory drum. At such time as this pulse is received from the reading head 72' the AND gate circuit 116 will be open to pass a signal therethrough to the flip-flop circuit 107 whereby this flip-flop circuit is switched to the set position. As the output of the set portion of the flip-flop circuit 107 is connected to the conductor 101, this latter conductor is then energized so that upon energization of the conductor 87 by coincident signals at the flip-flop circuit 86 from the item code reading heads, the AND gate circuit 99 is opened to pass a signal therethrough as required above. After the completion of one revolution of the memory drum, a second pulse is produced from the reading head 72' which will be seen to be applied to the AND gate circuit 117 having the other input thereof connected to the set output of the flip-flop circuit 107 so that this gate circuit is opened to pass a signal therethrough. With the switch 103 in the read position, as indicated in the drawings, this signal from the gate circuit 117 is then applied to the common reset line 118 so that the flip-flop circuits 106 and 107 are returned to the reset position. It will be appreciated that the start button 111 is normally physically positioned in juxtaposition with the code input keyboard so that in a conventional manner the code markings may be provided thereto by depressing particular keys upon such keyboard and the start switch depressed at the end of each code entry, as in a conventional cash register. A mechanical connection may be provided between the code input keyboard 54 and the printer 56 in the illustrated embodiment of the invention in order that the printer 56 will not only provide a printed record of the price information supplied thereto but will also at the same time provide a printed record of the particular code with which the price information corresponds.

The operation of the flip-flop circuits 106 to 110 requires a slight time delay between the output of the set portion thereof and the receipt of the pulse from the reading head 72' and it is herein assumed that this time delay is afforded by the time required for the flip-flop circuits to change from reset to set position. If this time delay is found to be insufficient with the particular flip-flop circuits employed, then suitable time delay means should be inserted in the set output of the flip-flop circuits.

The insertion of either price or code and price information upon the memory drum 51 is accomplished with the code input keyboard 54 and the price input keyboard 57. The writing heads 71 of the writing unit 52 are permanently associated with the memory drum 51, and the item code writing heads are connected through their respective amplifiers to the item code matrix 61, as illustrated by the conductors 78 and 79 in FIG. 4. Likewise, the price writing heads are connected at all times through the amplifiers thereof to the price input matrix 58, as exemplified by the conductors 133 in FIG. 4. These writing heads 71 are not energized until a command signal is applied to the respective amplifiers thereof through the conductor 131 from the counter 63. When this command pulse is received from the counter 63 the amplifier 132 operate to amplify and pass information received thereto from the item code matrix and price input matrix so as to thereby record such information upon the magnetic memory drum. In the drum herein employed, it is not necessary to erase information previously recorded thereon, for the writing heads will remagnetize the memory drum in accordance with the latest received signal. In order that an open longitudinal row on the memory drum may be readily identified for the insertion of new code and price information, all rows of the drum are initially recorded with continuous logical "ones" so that an unused row can therefore be found by searching for an item code consisting of all "ones."

The insertion of a new code and corresponding price information upon the magnetic memory drum 51 is accomplished by placing each of the switches 102, 103, and 104 in the write position and then depressing appropriate keys on the code input keyboard 54 and the price keyboard 57 followed by depression of the start button 111. The signal applied to the flip-flop circuit 106 will place the same in the set condition so that there is applied an input signal to the AND gate circuit 116 and the next pulse received from the reading head 72' will, upon application to this AND gate circuit 116, open same to thereby provide a signal placing the flip-flop circuit 107 in the set position. During the revolution following the output pulse from the reading head 72' the memory drum will be searched for the item code inserted by the code input keyboard and, assuming that this code has not previously been recorded upon the drum, no signal will be received to energize the conductor 87 as a result of this searching during one complete revolution. A second pulse is then received from the reading head 72' which will be applied to the AND gate circuit 117, together with the set pulse from the flop-flop circuit 107 so as to open this gate and apply a signal through the switch 103 to one input of the AND gate circuit 122. As the other input of this AND gate circuit 122 is connected to the reset output of the flip-flop 109, the AND gate circuit 122 is thereby opened to pass a pulse to the flip-flop circuit 108 and place same in the set position whereby the conductor 89 is energized. The conductor 88 is simultaneously de-energized, inasmuch as no output signal is received from the reset of flip-flop 108, and consequently one input signal is applied to the AND gate 77 in the item code reading head circuit while the previously available signal is removed from the AND gate circuit 76. Inasmuch as the other input of the other AND gate circuit 77 is connected to the logical "one" output of the reading head, each of the reading heads will pass signals through their corresponding gate circuits only upon the coincident encounter of logical "ones" at each of the reading heads simultaneously so that the gate circuits 82, 83, and 84 are energized only in this condition to thereby open the gate 86 and energize the conductor 87. The system will be seen therefore to ignore the code inserted therein at the code input keyboard 54 while searching for a row upon the magnetic memory drum which has only logical "ones" recorded thereon and which, consequently, is an open row available for the insertion of code and price information. During this latter revolution of the memory drum wherein the circuit is searching for a row thereon having only logical "ones" recorded thereon, the conductor 101 is energized from the set position of the flip-flop circuit 107 so that upon the energization of the conductor 87 in response to the finding of such a row, the gate circuit 99 will be opened to pass a signal therethrough. With the switch 102 in the write position, the signal passed by the AND gate circuit 99 will then be applied to an input of the counter circuit 63. As described above, this start signal applied to the counter 63 will commence such counter to counting the pulses received from the reading head 72". As one pulse per row is produced by the reading head 72" the number of rows will be counted following the receipt of a start signal at the counter. The counter 63 is previously set to produce an output signal following the counting of a predetermined number of rows corresponding to the separation between the reading heads 72 and the writing heads 71. This output signal from the counter 63 forms the command signal on the conductor 131 whereby the amplifiers 132 of the write unit 52 are energized. As the writing heads 71 are in receipt of signals from the item code matrix and price input matrix, the command signal received by energization of the conductor 131 from the counter 63 serves to cause these amplifiers to apply the price and code information to the writing heads 71 whereupon same record the information upon the memory drum. The pulse received on the line 87 from the row of logical "ones" is applied through the switch 104 to the flip-flop circuits 108 and 109 to reset the former and set the latter. As the flip-flop circuit 108 is changed to reset condition the conductor 88 is energized and the conductor 89 is de-energized so that the gate circuit 77 is closed and the gate circuit 76 is provided with one input signal for possible conduction in accordance with the presence of other input signals thereto, as described below. The reading heads will then be seen to be restored to such condition that they again search for the item code set up on the item code keyboard. The output of flip-flop circuit 109 from the set portion thereof is applied to the AND gate circuit 123 so that upon the receipt of a pulse from the reading head 72' this gate circuit 123 will pass a signal through the OR gate circuit 126 to set the flip-flop circuit 110. The gate 97 is connected to the flip-flop circuit 110 at the set output terminal there of that this gate circuit 97 is opened by the simultaneous application thereto of the signal from the conductor 87 and from the flip-flop circuit 110 to thereby place the flip-flop circuit 96 in the set condition and record upon the printer 56 the information just recorded upon the memory drum. This operation will be seen to serve as a check on the recorded information. Following one revolution, the reading head 72' will produce another output pulse which will be applied to the input of the AND gate circuit 127 so that together with the signal applied from the set output of the flip-flop 110 this circuit will conduct to thereby energize the reset conductor 118 and reset the flip-flop circuits. The overall circuit is then in condition for the next start signal.

Another operation which the circuit hereof is adapted to carry out is the changing of the price information upon the magnetic memory drum corresponding to a particular item code already recorded thereon. In this condition, operation commences in the same manner as discussed above; however, during the first revolution after the flip-flop circuit 107 is placed in the set condition, the search for the item code will be successful so that an output signal appears on the conductor 87. The counter 63 is then started and proceeds in the manner described above to produce a command signal whereby the writing unit 52 operates to record both the item code and new price information upon the memory drum. Inasmuch as the item code is the same as that already existing upon the memory drum at the particular position chosen for the insertion of a new price information, no actual change is made in the item code upon the memory drum, although the price information corresponding thereto is changed by the recording. The coincident pulse occuring on the conductor 87 is transmitted through the switch 104 to set the flip-flop circuit 109 and reset the flip-flop circuit 108. By the removal of a signal from the reset output of the flip-flop circuit 109, one of the input signals to the gate circuit 122 is removed, so that this gate circuit is opened. Consequently, at the end of one revolution the pulse received from the reading head 72' will not be able to pass through this gate 122 and therefore cannot set the flip-flop circuit 108 so that this circuit remains in the reset condition. The pulse from reading head 72' will, however, operate in conjunction with the output of the set portion of flip-flop circuit 109, open gate 123 to pass a signal through the lower gate circuit 126 to set the flop-flop circuit 110 whereby the conductor 98 is energized so that the newly recorded information will be printed at the printer 56 in accordance with the above-described operation.

From the foregoing brief description of the simplified circuit illustrated in FIG. 4, it is believed evident that the present invention is highly adapted to the automatic production of printed records of code and price information so as to materially simplify handling operations. The degree of flexibility afforded by the circuit hereof, even in the simplified form illustrated, substantially enhances the applicability thereof. Information recorded upon the magnetic memory drum of the present invention is at all times available for review and use and, furthermore, such information is quite readily changed by a simple keyboard operation. Rapid and ready changes in price information relating to particular item codes serve to make the invention hereof highly suited to circumstances wherein price variations may be encountered.

Although the present invention has been disclosed in connection with particular examples of utility thereof and in regard to certain specific steps and embodiments of the invention, it is to be appreciated that substantial variations therein are possible within the proper scope of the present invention. Thus, other information besides price information may be recorded upon the memory unit of the invention so that there is produced in addition to item code markings at the printer thereof some other related information of particular interest to those handling materials.

We claim:

1. Apparatus for handling articles subject to differences from one another and each bearing a labeling of significant coded indicia unique to the particular article and wherein said indicia normally is applied to the article prior to its distribution and offer for sale and where only identical items bear like indicia adequate for subsequent price determination and inventory representation which comprises a computer and memory means;
means to record the indicia of each article in the computer and memory prior to display for sale and there storing such information for selected time periods;
means to record price information for each different coded indicia in the computer and memory means in predetermined relation to the corresponding stored coded indicia;
means for maintaining the price information in the memory and computer for selected time periods in a state subject to substantially instantaneous change relative to any coded indicia on each article;
means to register the coded indicia of each article as actually accepted by a buyer for purchase into the memory and computer system at a distribution point of the coded items;
means responsive to said coded indicia as registered in the computer and memory at the time of activation of the register means and to the coded indicia of each item stored in the computer and memory means for immediate comparison between each;
means to prepare from the stored price information of said memory and computer system and the comparison of stored coded indicia and the information supplied relative to coded indicia at the time of sale a visible record relating the coded indicia of the selected and previously stored price information of each item identified to the memory and computer system at the distribution point thereby to provide an immediately available visible sales record for items distributed, free from any need for price marking on the individual articles and to maintain automatically an inventory record.

2. A circuit for automatically producing a visual indication of the prices of items handled and including a memory unit having writing heads and reading heads associated therewith for the recording of information thereon and reading of such information, a code keyboard adapted for actuation to produce signals corresponding to item codes of items being handled, an item code matrix connected to said code keyboard and producing signals responsive thereto in the binary system, means connecting said item code matrix to the writing heads of said memory unit, a control circuit receiving signals from said item code matrix and comparing same through said reading heads with item codes retained by said memory unit to produce output signals from said reading heads corresponding to prices associated with individual item codes as recorded upon said memory unit, a price output matrix receiving price signals from said control circuit and converting same into the decimal system, a printing unit linked to said code keyboard and receiving signals from said price output matrix for producing a record of item codes and corresponding prices, and means connecting said control circuit to the writing heads of said memory unit for energizing same to operate in accordance with signals received from said code matrix.

3. A circuit as set out in claim 2 further characterized by a price keyboard adapted for operation in conjunction with said code keyboard to apply item codes and corresponding prices to said memory unit through the writing heads thereof, said price keyboard producing signals corresponding to price markings applied thereto, a price input matrix receiving signals from said price keyboard and converting same to the binary system for application to writing heads of said memory unit, and counting means connected between said control circuit and said writing heads for applying a command signal to said writing heads to actuate same whereby item code and price information is applied to said memory unit.

4. An automatic pricing circuit comprising an item code keyboard adapted for actuation to produce signals representative of code markings upon items being priced, a printing unit connected to said item code keyboard for producing a printed record of item codes and corresponding prices in response to signals applied thereto, a memory unit including a rotary electromagnetic memory drum having a plurality of writing heads aligned longitudinally thereof and a plurality of reading heads also aligned longitudinally thereof in circumferentially displaced relationship from said writing head, a first matrix circuit connected to said item code keyboard and producing from signals received from said item code keyboard output signals in the binary system, a plurality of coincidence circuit connected one to each of the reading heads adapted to reproduce item code signals from said memory drum, means connecting said first matrix to said coincidence circuit, whereby an output signal is produced at a point of coincidence between an input item code and code marking signals at a particular point upon said drum, further coincidence circuits connected to reading heads producing price signals and operating in response to the aforesaid coincidence signal to produce a price output signal in response to an identity between the input code signal and a like signal recorded on said magnetic drum, and means applying said price signals to said printing means for producing a record of corresponding item codes and price signals so passed by said latter coincidence means.

5. A circuit as defined in claim 4 further characterized by a reading head producing one signal from each longitudinal row of the magnetic drum, as some rotates therepast, a counter circuit operating to produce an output signal following a predetermined number of counts, means connecting said item code reading head coincidence circuit to said counter for initiating operation thereof, means connecting said counter to said writing heads for energizing same, and means applying price signals to said writing head whereby price information is applied to said memory drum through said writing head in correspondence to item code signals supplied to said memory drum.

6. An automatic item and price register adapted for use with coded items comprising item code input means supplying electrical signals indicative of item codes, a memory unit adapted to receive and retain item code markings and price information corresponding thereto and including item code reading means and price reading means scanning said unit, means producing a signal for each complete scan of information in said memory unit, the scanning means for said memory unit including a plurality of elements scanning limited portions of said memory unit, a coincidence circuit including three AND gate circuits associated with each of said scanning elements, means connecting each of said scanning elements to the inputs of each of said AND gate circuits, means connecting said item code input means to the inputs of the first and second of each of said three AND gate circuits, a flip-flop circuit normally retained in a reset condition and connected to power supply means through a start switch for energization to a set position thereby, and AND gate circuits having the inputs thereof connected to the set position of said flip-flop circuit and to the scan reading means to produce an output signal in response to a coincidence therebetween, a second flip-flop circuit normally maintained in a reset condition and connected to the output of said last stated AND gate circuit for switching to a set position, means connecting said second flip-flop circuit from the set position thereof to another AND gate circuit, means supplying another input of said latter AND gate circuit with a signal produced by a coincidence between an input item code signal and recorded item code signals on said memory unit for opening said latter AND gate circuit, a bistable switching circuit normally maintained in a reset position and having connection to the output of said latter AND gate circuit for switching to the set position thereof upon the receipt of signals therefrom, a plurality of controllable switches connected one to each of the price scanning elements, a printing unit adapted to produce a printed record of price information supplied thereto, means connecting said plurality of controllable switches to said printing unit, and means connecting said bistable switching circuit to control said plurality of price switches whereby said printing unit receives only such price signals as correspond to item code markings on said memory unit coincident with item code signals applied to the system.

* * * * *